United States Patent
Duffett-Smith et al.

(10) Patent No.: US 7,508,883 B2
(45) Date of Patent: Mar. 24, 2009

(54) RADIO POSITIONING SYSTEMS

(75) Inventors: Peter James Duffett-Smith, Cambridge (GB); Malcolm David Macnaughtan, Sydney (AU); John Christopher Clarke, Cambridge (GB); Robert Willem Rowe, Villefranche (FR)

(73) Assignee: Cambridge Positioning Systems Limited, Cambridge (GB)

( * ) Notice: Subject to any disclaimer, the term of this patent is extended or adjusted under 35 U.S.C. 154(b) by 453 days.

(21) Appl. No.: 10/518,073

(22) PCT Filed: May 13, 2003

(86) PCT No.: PCT/GB03/01943

§ 371 (c)(1),
(2), (4) Date: Jan. 25, 2005

(87) PCT Pub. No.: WO03/107029

PCT Pub. Date: Dec. 24, 2003

(65) Prior Publication Data

US 2005/0200525 A1    Sep. 15, 2005

(30) Foreign Application Priority Data

Jun. 17, 2002    (EP) .................................. 02254215

(51) Int. Cl.
*H04L 27/00* (2006.01)
(52) U.S. Cl. ..................................... 375/295
(58) Field of Classification Search .................. 375/295
See application file for complete search history.

(56) References Cited

U.S. PATENT DOCUMENTS 5,838,279 A    11/1998    Duffett-Smith et al. ..... 342/459

(Continued)

FOREIGN PATENT DOCUMENTS

EP    1118871    7/2001

(Continued)

OTHER PUBLICATIONS

Duffett-Smith, PJ; McNaughtan, MD: "Precice UE Positioning in UMTS Using Cumulative Virtual Blanking", 3G Mobile Communication Technologies, May 8-10, 2002, Conference Publication No. 489, pp. 355-359.

(Continued)

*Primary Examiner*—David C Payne
*Assistant Examiner*—Nader Bolourchi
(74) *Attorney, Agent, or Firm*—Roylance, Abrams, Berdo & Goodman, L.L.P.

(57) ABSTRACT

The present invention sets out to overcome the hearability problem in CDMA communications networks in which positioning services are provided, by using a separate sampling device 204, 205, 206 for each transmitter 201, 202, 203, which sends to the computing device 208 a representation of the signals transmitted only by that transmitter. A cross-correlation of the representation sent back by the mobile terminal 207 with the representation sent back by the sampling device in the brightest transmitter is performed in the computing device 208, and a blurred estimate of that brightest signal is subtracted from a blurred version of the representation sent back by the mobile terminal 207 in order to reduce its effect on the remaining signals as far as possible. The cross-correlation and subtraction steps are iterated until no useful signals remain to be extracted.

30 Claims, 7 Drawing Sheets

U.S. PATENT DOCUMENTS

| | | | |
|---|---|---|---|
| 6,094,168 A | 7/2000 | Duffett-Smith et al. | 342/463 |
| 6,275,705 B1 | 8/2001 | Drane et al. | 455/456 |
| 6,342,854 B1 | 1/2002 | Duffett-Smith et al. | 342/457 |
| 6,522,890 B2 | 2/2003 | Drane et al. | 455/456 |
| 6,529,165 B1 | 3/2003 | Duffett-Smith et al. | 342/463 |

FOREIGN PATENT DOCUMENTS

| | | |
|---|---|---|
| EP | 1235076 | 8/2002 |
| EP | 1255122 | 11/2002 |
| EP | 1271178 | 1/2003 |
| EP | 1278074 | 1/2003 |
| EP | 1185877 | 3/2003 |
| EP | 1185878 | 3/2003 |
| EP | 1301054 | 4/2003 |
| WO | 9730360 | 8/1997 |
| WO | 9911086 | 3/1999 |
| WO | 0055992 | 9/2000 |

OTHER PUBLICATIONS

Suzuki H. et al.; An Orthogonal Successive Interference Canceller for the Downlink Communications in a DS-CDMA Mobile System; Globecom'00, 2000 IEEE Global Telecommunications Conference, San Francisco, CA, Nov. 27-Dec. 1, 2000, New York, NY: IEEE, US, vol. 2 of 4, Nov. 27, 2000, pp. 847-851.

RADIO POSITIONING SYSTEMS

This application claims the benefit of PCT Application No. PCT/GB03/01943, filed May 13, 2003 based on European Application No. 02254215.3, filed Jun. 17, 2002.

BACKGROUND OF THE INVENTION

1. Field of the Invention

The present invention relates to radio positioning systems generally, and more particularly to improved methods of finding the positions of mobile terminals in radio communication systems, especially those employing Code Division Multiple Access (CDMA) technology.

2. Description of the Related Art

There are many systems known by which the position of a mobile terminal operating in a radio communications network may be determined. These include using the signals from transmitters not connected with the network, such as the Global Positioning System (GPS) satellites, but others make use of the signals radiated by the mobile terminal and picked up by remote receivers, such as the Time Of Arrival (TOA) and so-called "Radio Finger Printing" systems or, vice versa, using the signals radiated by the network itself and picked up by the mobile terminal. Chief amongst the last category are the Enhanced Observed Time Difference (E-OTD) and Observed Time Difference Of Arrival (OTDOA) systems.

The E-OTD system, although generally applicable to many different communication technologies, has been particularly applied to the Global System for Mobiles (GSM). Two principal, and different, methods of using the timing offsets of signals received from the network transmitters in the position computation have been described in the art. In one, e.g. EP-A-0767594, WO-A-9730360, U.S. Pat. No. 6,108,553 and AU-B-716647, the signals measured by a fixed receiver are used, in effect, to 'synchronise' the transmissions from the different transmitters. The instantaneous transmission time offsets of each transmitter relative to its neighbours are calculated from the values measured at the fixed receiver using the known positions of the fixed receiver and the transmitters. The timing offsets measured by the mobile terminal can then be used in a calculation based on well-known standard techniques in which the points of intersection of two or more hyperbolic position lines predict the position of the mobile terminal.

The other method (see our EP-B-0303371, WO-A-8901637, U.S. Pat. No. 6,094,168, EP-A-1025453, and WO-A-9921028, the details of which are hereby incorporated by reference and which refer to a system known as Cursor®) makes use of the measurements made by both the fixed receiver and the mobile terminal to calculate the relative time difference between the signals received from each transmitter by both receivers. This results in a calculation based on the intersection of circles centred on the transmitters.

E-OTD methods, as applied to GSM, have been considered for use in wide-band CDMA systems, in particular those within the Universal Mobile Telephone System (UMTS) 'third generation' (3G) technologies. Here, E-OTD has been re-named OTDOA, but it suffers from a major problem, the so-called 'hearability' problem. In CDMA networks generally, signals are transmitted by the network transmitters all using the same radio-frequency (RF) channel. In UMTS this channel is about 5 MHz wide. The signals from each transmitter are encoded using a unique 'spreading code' which allows a mobile terminal to pick out the required signal provided that (a) it knows the spreading code used by that transmitter, and (b) its internal clock is synchronized with the transmitter signals. To assist with the latter, each transmitter also radiates a 'pilot code' within the same RF channel whose coding and other characteristics make it easily distinguishable. The mobile terminal first detects and locks on to the pilot signal, receives the spreading code used by that transmitter, and then is able to decode the main transmissions. The hearability problem arises when the mobile terminal is near to a transmitter. E-OTD systems (and therefore OTDOA systems) require the measurements of the time offsets associated with at least three geographically-distinct transmitters, but when the mobile terminal is too close to a transmitter, the signals from the more-distant transmitters are drowned out by the local signals to the extent that their time offsets cannot be measured. One technique, known as 'Idle Period on the Down Link' (IP-DL), has been proposed to overcome this problem by which the transmissions from the local transmitter are turned off periodically in a so-called 'idle period' during which the signals from the distant transmitters may be received. This has the serious disadvantages that (a) the capacity of the network to carry voice & data traffic is diminished, and (b) it is complicated to install and operate, requiring in one of its forms additional messaging in the network to coordinate the idle periods amongst the transmitters.

An alternative method of countering the hearability problem is described in European patent application number 01306115.5, which provides details of an adaptation of the Cursor® system, especially as described in our U.S. Pat. No. 6,094,168, to CDMA systems in general and particularly to UMTS in such a fashion as to overcome the hearability problem. No idle period is required, and the communications function can therefore operate with full capacity.

The Cursor® system, as described in U.S. Pat. No. 6,094,168, uses two receivers, one fixed and at a known location and the other within the mobile terminal, to receive the signals radiated by each transmitter taken separately. Representations of the received signals are sent back to a computing node where they are compared (generally by cross-correlation) to determine the time offset of receipt of the signals by each receiver. This process is repeated for at least two other geographically-distinct transmitters (transmitting on different RF channels in a GSM system) to obtain the three time offsets required for a successful position computation.

In direct sequence CDMA systems the transmitters use the same RF channel. A direct application of the Cursor® system to CDMA would therefore result in a cross-correlation with many peaks, each corresponding to the alignment of the signals received from a particular one of the transmitters by both receivers. If it were possible to measure the peaks associated with at least the three required transmitters, the system would serve for positioning. However, as illustrated below, the signal to noise ratios (SNRs) associated with more-distant transmitters are often too small, and we have a similar hearability problem as described above.

The following mathematical analysis provides an understanding of the prior art method of countering hearability as described in EP application no. 01306115.5. FIG. 1 shows the geometry of a two-dimensional system in which all the transmitters and the mobile terminal lie in one plane. The positions of transmitters A, B, and C are represented by the vectors a, b, c, all with respect to the same common origin, O. The mobile terminal, R, is at vector position x. Each of the transmitters has incorporated with it a sampling device which samples the signals transmitted by that transmitter and which sends back to a computing device (not shown in FIG. 1) a representation thereof. For simplicity, we make the assumption that the transmitters are synchronized with each other, so that their relative transmission time offsets are known and equal to zero. It is described elsewhere in e.g. U.S. Pat. No. 6,094,168 how the relative transmission time offsets can be measured in unsynchronized networks. Let us suppose that the mobile terminal is nearest to transmitter A, then B, then C. The computing device first performs a cross-correlation between the representation of the signals received (all on the same RF channel) from A, B, and C by R, and the representation of the signals transmitted by A. Since the signals from A, B, and C have orthogonal spreading codes, the cross-correlation results in a single peak whose position represents the time-offset of the receipt of the signals from A by R, together with the clock error, e (in equivalent length dimensions), of the receiver in the mobile terminal. This time offset, $\Delta t_A$, is given by $$v\Delta t_A = |x-a| + \epsilon,$$

where v is the speed of the radio waves, and the vertical bars denote the magnitude of the contained vector quantity. Similarly, for B and C we have $$v\Delta t_B = |x-b| + \epsilon,$$

$$v\Delta t_B = |x-c| + \epsilon. \quad \{1\}$$

Having established the time offset of the signals from A, the computing node now subtracts an estimate of the signal received from A by R. The representations of the signals radiated at time t by the transmitters A, B, and C, may be denoted by $S_A(t)$, $S_B(t)$, and $S_C(t)$ respectively. The signal received by the mobile terminal comprises a combination of these. In the absence of multipath, noise and non-linear effects, the representation of the received signals may be denoted by r(t), where $$r(t) = \alpha S_A(t-\Delta t_A) + \beta S_B(t-\Delta t_B) + \gamma S_C(t-\Delta t_C), \quad \{2\}$$

and $\alpha$, $\beta$, $\gamma$ are complex constants representing the path losses to the mobile terminal from the respective transmitters. A software program running in the computing node estimates the magnitude of $S_A(t)$, delayed by $\Delta t_A$, to subtract from r(t), for example by finding the value of $\alpha$ which minimises the mean square amplitude of the residual r'(t). In the perfect case this would remove the contribution of A altogether, so that $$r'(t) = \beta S_B(t-\Delta t_B) + \gamma S_C(t-\Delta t_C).$$

The cross-correlation is now carried out between r'(t) and $S_B(t)$ to estimate $\Delta t_B$, and a further subtraction made to remove the contribution of B from the residual, r''(t), where $$r''(t) = \gamma S_C(t-\Delta t_C),$$

if the subtraction is perfect. Finally, a cross-correlation between r''(t) and $S_C(t)$ results in an estimate of $\Delta t_C$. Equations $\{1\}$ can then be solved for x as described in U.S. Pat. No. 6,094,168.

In practice, the signals received by the mobile terminal are corrupted by noise, interference and multipath effects. Furthermore, the representations of the signals may be in a digital format of low resolution. The process of subtraction will not be perfect in these circumstances, but may nevertheless be sufficient to overcome the hearability problem. An example of a prior art system (as proposed in EP application no. 01306115.5) wherein the subtraction is sufficient to overcome the hearability problem will now be described with reference to FIGS. 2 to 7. It is necessary to appreciate fully the prior art in order to understand the advance of the present invention.

FIG. 2 shows a simplified UMTS system consisting of three communications transmitters (Node Bs) 201, 202, 203, each of which has a sampling device 204, 205, 206, a single terminal (user equipment, UE) 207, and a computing device (serving mobile location centre, SMLC) 208. Each Node B has an omni-directional antenna, and is configured to transmit signals typical of network traffic load. Table 1 below indicates the different physical channels in use, together with their power levels and symbol rates. The acronyms appearing in the left-hand column, P-CPICH etc., are those that have been adopted by the industry to represent the channels. Random binary sequences are used to modulate the DPCHs. The three Node Bs use orthogonal primary scrambling codes, in this case numbers 0, 16 and 32 respectively.

TABLE 1

Node B channel configuration

| Channel | Relative power Level/dB | Symbol rate/Kss$^{-1}$ |
|---|---|---|
| P-CPICH | −10 | 15 |
| P-SCH | −10 | 15 |
| S-SCH | −10 | 15 |
| P-CCPCH | −10 | 15 |
| PICH | −15 | 15 |
| DPCH0 | Note 1 | Note 2 |
| DPCH1 | Note 1 | Note 2 |
| DPCH2 | Note 1 | Note 2 |
| ... | Note 1 | Note 2 |
| ... | Note 1 | Note 2 |
| DPCH63 | Note 1 | Note 2 |
| DPCH64 | Note 1 | Note 2 |

Note 1:
DPCH power levels were chosen randomly from −10 dB to −25 dB
Note 2:
DPCH symbol rates were chosen randomly from 15 to 240 Kss$^{-1}$ The Node Bs here are tightly synchronised. As already noted above, this is not a requirement in normal practice, but is convenient for the purpose of demonstration.

It will be noted from FIG. 2 that the UE 207 is relatively close to Node B 201 and at greater distances from Node Bs 202 and 203. Thus the signal from Node B 201 is the strongest (0 dB relative to itself) with the signal from Node B 202 weaker at −15 dB and that from Node B 203 weakest of all at −30 dB. The three sampling devices 204, 205, 206 are instructed by the SMLC 208 to record and report the signal transmitted by the associated Node B during the first 256 chips immediately following the start of the next second. These signals are sampled at a rate of 2 samples per chip, with a resolution of 4 bits.

The problem of hearability is highlighted by considering the conventional E-OTD or OTDOA approach to measuring the time offsets of the signals received by the UE 207. A reference copy of the primary scrambling code used on the CPICH by each Node B (i.e. the first 256 chips of each of scrambling codes 0, 16 and 32), is cross-correlated with the signal received by the UE 207 and a search is made for the highest correlation peak. FIG. 3 illustrates a typical result. Note that the signals received by the UE 207 are also sampled at a rate of 2 samples per chip, with a resolution of 4 bits. The resulting cross-correlation profiles show one clearly distinguishable peak 301 in the correlation for scrambling code 0, corresponding to the time offset of the signals from Node B 201. However, the cross-correlation results for the codes 16 and 32 do not yield any clear peaks. This is because the signals received by the UE 207 from Node Bs 202 and 203 are swamped by the relatively strong reception from Node B 201. Were they visible, these peaks should be positioned to the right of the visible peak 301 by 1 and 2 microseconds respectively for the signals from Node Bs 202 and 203 (corresponding to 3.8 and 7.6 chips). The lack of detection of the signals from 202 and 203 means that it is not possible to compute an E-OTD or OTDOA position fix, since at least three independent timings are needed.

The prior art method described in EP 01306115.5 is now illustrated using the same test system. In this case, each sampling device 204, 205, 206 records a section of the signals transmitted by its associated Node B 201, 202, 203 respectively. This section is one symbol in duration and is again sampled at a rate of 2 samples per chip, with a resolution of 4 bits. The UE 207 also records a 256-chip section of the signals it receives, aligned with the first symbol on the CPICH in a particular timeslot, at the same sampling rate and resolution.

At the SMLC 208, the three recordings reported by the three sampling devices 204, 205, 206 are each cross-correlated in turn with the recording made by the UE 207, and the results are shown in FIG. 4. The peaks of the resulting correlation profiles are used to determine the relative levels of the three contributions in the received signal and hence the order in which they are to be subtracted. Once again, the cross-correlation for Node B 201 yields the largest peak 401. Note also that, in contrast with FIG. 3, the cross-correlation for Node B 202 also yields a clear peak 402. This is because the cross-correlation is performed using the total signal transmitted by the Node Bs rather than merely using the CPICH, which represents a fraction of the total transmitted energy in each case.

Having identified the time offset of the signal from Node B 201, the recording of the signal reported by the sampling device 204 is now used to construct an appropriately scaled, delayed and phase-rotated copy of that signal. The results of this process are plotted in FIG. 5. The upper plot shows the real component of the original signal recorded by the UE 207 as a solid curve whilst the dotted curve shows the estimated scaled, delayed and rotated signal. The lower plot shows a similar comparison of the imaginary parts of received and estimated signals. Note that whilst a duration of 256 chips is actually used in the example, the time axis in this Figure has been limited to about 50 chips. The estimated recordings are subtracted from the total UE recording leaving a residual recording.

The recordings from the sampling devices 205 and 206 are now cross-correlated with the residual recording giving the results shown in FIG. 6. Note that in this case, following the removal of the signal from Node B 201, there is a clear correlation peak 601 for the signals from Node B 203 as well as a peak 602 for Node B 202. These peaks are used to estimate the time offsets of the corresponding signals, giving sufficient independent timing measurements (three in this case) to compute a position fix.

If the peak 601 corresponding to the signals from Node B 203 is too weak to be resolved, a further iteration could be undertaken in which the signals from Node B 202 could be subtracted to yield a second residual signal (FIG. 7). There is a clear correlation peak 701 at a delay of approximately 7 chips as expected.

In the prior art method of EP 01306115.5 discussed above, the assumption is made that the signal received at the terminal is a simple sum of the transmitted signals attenuated, phase rotated and delayed by the individual path lengths between transmitter and receiver. In a more complex system in which the transmission channel has incorporated non-linear effects, multi-path and noise, the transmitted signal is further degraded by these effects making the edges of the waveform less clearly defined in time. This process we have called a 'blurring' of the signal. When attempting to cancel a blurred signal, the process of subtracting only a simply scaled, delayed and phase rotated copy of the signal recorded by one sampling device from the signal received at the terminal may not remove the contribution from the transmitter associated with the one sampling device accurately enough.

SUMMARY OF THE INVENTION

The present invention therefore provides improved methods which remove more accurately the contribution of the signals from the transmitter associated with the one sampling device from the signals received at the terminal by creating an equivalently 'blurred' estimate of the signal recorded at the terminal.

A first aspect of the invention therefore provides a method of finding the time offset between signals transmitted by at least one of a plurality of transmitters of a communications network and received by a receiver attached to a terminal, the method comprising the steps of (a) creating at the terminal a section of a representation of the signals from the transmitters received by the receiver;

(b) creating a first section of a representation of the signal transmitted by a first of said transmitters, and creating a second section of a representation of the signal transmitted by a second of said transmitters, each of which sections overlaps in time with the section created at the terminal;

(c) creating a first function dependent on the first section and the section created at the terminal in step (a), and convolving the first section with the first function to form a blurred estimate of the signal received at the terminal from the first transmitter;

(d) creating a second function dependent on the first section and the section created at the terminal in step (a), and convolving the terminal section with the second function to form a blurred terminal section;

(e) subtracting the blurred estimate from the blurred terminal section to produce a blurred residual representation; and (f) estimating the time offset between the blurred residual representation and the second section.

A second aspect of the invention therefore provides a method of finding the time offset relative to a reference within the terminal of a component of a signal transmitted by one of a plurality of transmitters of a communications network and received by a receiver attached to a terminal, the method comprising the steps of (a) creating at the terminal a section of a representation of the signals from the transmitters received by the receiver (a "terminal section");

(b) creating a section of a representation of the signal transmitted by another transmitter (a "transmitter section"), which section overlaps in time with the section created at the terminal;

(c) creating a first function dependent on the terminal section and the transmitter section created in steps (a) and (b), and convolving the terminal section with the first function to form a blurred estimate of the signal received at the terminal from the other transmitter;

(d) creating a second function dependent on the terminal section and the transmitter section created in steps (a) and (b), and convolving the terminal section with the second function to form a blurred terminal section;

(e) subtracting the blurred estimate from the blurred terminal section to produce a blurred residual representation; and (f) estimating the time offset between the blurred residual representation and the signal component.

BRIEF DESCRIPTION OF THE DRAWINGS

The invention may be further understood by reference to the accompanying drawings, in which.

DETAILED DESCRIPTION OF THE EXEMPLARY EMBODIMENTS

Figure 1:
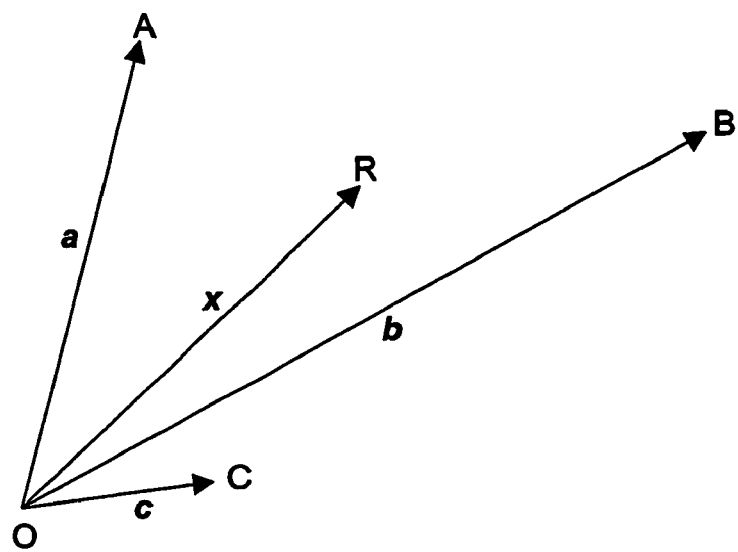
FIG. 1 shows the geometry of a two-dimensional communications system in which all the transmitters and the mobile terminal lie in one plane.

The present invention provides improved methods which remove more accurately the contribution of the signals from the transmitter associated with the one sampling device from the signals received at the terminal by creating an equivalently 'blurred' estimate of the signal recorded at the terminal.

This process requires the creation of short sections of the recorded and sampled baseband representations of the signal to be used in the method. We have called such a section of data 'a section of the representation of the signal' in the following description.

A first aspect of the invention therefore provides a method of finding the time offset between signals transmitted by at least one of a plurality of transmitters of a communications network and received by a receiver attached to a terminal, the method comprising the steps of (a) creating at the terminal a section of a representation of the signals from the transmitters received by the receiver;

(b) creating a first section of a representation of the signal transmitted by a first of said transmitters, and creating a second section of a representation of the signal transmitted by a second of said transmitters, each of which sections overlaps in time with the section created at the terminal;

(c) creating a first function dependent on the first section and the section created at the terminal in step (a), and convolving the first section with the first function to form a blurred estimate of the signal received at the terminal from the first transmitter;

(d) creating a second function dependent on the first section and the section created at the terminal in step (a), and convolving the terminal section with the second function to form a blurred terminal section;

(e) subtracting the blurred estimate from the blurred terminal section to produce a blurred residual representation; and (f) estimating the time offset between the blurred residual representation and the second section.

Preferably, the first function, which is used to create the blurred estimate, is a convolution of the first section of a representation of the signal transmitted by a first of said transmitters (the 'first section') with a cross-correlation of the section of a representation of the signals from the transmitters received by the receiver (the 'terminal section') and the first section. The above cross-correlation is preferably a windowed cross-correlation created by enhancing the significant components of the cross-correlation function.

Similarly, the second function, which is used to create the blurred terminal section, is a convolution of the terminal section with the auto-correlation profile of the first section.

Preferably, the blurred residual representation is cross-correlated with the second section of a representation of the signal transmitted by a second of said transmitters (the 'second section') to estimate the time offset.

Preferably, the first and second sections are created at the respective first and second transmitters, but they may be created elsewhere. They may be created in one or more sampling devices attached to the respective transmitters or located elsewhere, or they may be created by computer programs running anywhere in the communications network, or elsewhere, using information supplied from the network about the transmitted signals.

The various signal representation sections may be sent to one or more computing devices in which said estimates and time offsets, and a terminal location estimate, may be calculated. In some embodiments, the time offset between said section of a representation of the signals received by the receiver and said first section may first be calculated, and may then be used in the calculation of said terminal location estimate. The time offset between said section of a representation of the signals received by the receiver and said first section may be calculated using said sections or it may be calculated by other means, for example by calculating the time offset of a known component of the signal such as a pilot code. The time offset between said blurred residual representation and said second section may be calculated using said second section or it may be calculated by other means, for example by using a known component of the signal such as a pilot code.

The present invention thus overcomes the hearability problem by, for example, using a separate sampling device for each transmitter which sends to a computing device a representation of the signals transmitted only by that transmitter, by performing a cross-correlation of the representation sent back by the mobile terminal with the representation sent back by the sampling device associated with one of the transmitters to estimate the time offset between them, and by subtracting a blurred estimate of that signal from a blurred representation sent back by the mobile terminal, in order to reduce its effect on the remaining signals as far as possible. The cross-correlation and blurred subtraction steps may be iterated until no useful signals remain to be extracted. Simulations show that this provides a greater hearability gain than the straight subtraction method of the prior art of EP 01306115.5 while maintaining the advantages over IP-DL.

In some systems, the hearability problem may be solved simply by subtracting a blurred estimate of the signals received from just one transmitter, usually the brightest, from a blurred representation of the signals received at the terminal leaving a blurred residual representation in which the time offsets of the pilot codes, blurred pilot codes or any other known portions of the transmitted signals, may be determined.

Thus a second aspect of the invention therefore provides a method of finding the time offset relative to a reference within the terminal of a component of a signal transmitted by one of a plurality of transmitters of a communications network and received by a receiver attached to a terminal, the method comprising the steps of (a) creating at the terminal a section of a representation of the signals from the transmitters received by the receiver (a "terminal section");

(b) creating a section of a representation of the signal transmitted by another transmitter (a "transmitter section"), which section overlaps in time with the section created at the terminal;

(c) creating a first function dependent on the terminal section and the transmitter section created in steps (a) and (b), and convolving the terminal section with the first function to form a blurred estimate of the signal received at the terminal from the other transmitter;

(d) creating a second function dependent on the terminal section and the transmitter section created in steps (a) and (b), and convolving the terminal section with the second function to form a blurred terminal section;

(e) subtracting the blurred estimate from the blurred terminal section to produce a blurred residual representation; and (f) estimating the time offset between the blurred residual representation and the signal component.

Preferably, the first function, which is used to create the blurred estimate, is a convolution of the transmitter section with a cross-correlation of the terminal section and the transmitter section. This cross-correlation is preferably a windowed cross-correlation created by enhancing the significant components of the cross-correlation function.

Similarly, the second function, which is used to create the blurred terminal section, is a convolution of the terminal section with the auto-correlation profile of the transmitter section.

The known components of the transmitted signals in the second aspect of the invention may, for example, be the pilot codes. Before the time offset is estimated the known signal components may be blurred by convolution with another function.

In both the first and the second aspects of the invention, the section of the representation of the signals received by the receiver at the terminal may be recorded in the terminal before being sent to a computing device. Alternatively, the section may be transferred in real time to the computing device and a recording made there.

Preferably, the section of the representation of the signals transmitted by a transmitter is created at that transmitter, but it may be created elsewhere. It may be created in a sampling device attached to the transmitter or located elsewhere, or it may be created by a computer program running anywhere in the communications network, or elsewhere, using information supplied from the network about the transmitted signals.

The calculations may be carried out in a computing device which may be in the handset or elsewhere, for example, a processor connected to the network.

The terminal may be a part of a positioning system, for example as described in any of EP-A-0767594, WO-A-9730360, AU-B-716647 EP-B-0303371, U.S. Pat. No. 6,094,168 and EP-A-1025453 and may be a fixed device associated with a transmitter (for example, the 'fixed receiver' or 'Location Measurement Unit, LMU'), whose purpose is to receive signals from distant transmitters as well as from its associated transmitter, in which case the method of the invention includes the estimation of and subtraction of the signals from its associated transmitter in order to allow it to measure the time offsets of the signals received from distant transmitters.

The representation of the signals received by the receiver attached to the terminal may be a digitised version of the received signals converted first to baseband in the receiver. The representation of the signals transmitted by a transmitter may be a digitised version of the transmitted signals converted first to baseband.

In order to ensure an overlap of the respective sections, a suitably chosen component of the transmitted signals may be used to indicate the start of sampling.

The invention also includes apparatus including a processing means arranged to carry out the method of the first or second aspects of the invention described above.

The apparatus for carrying out the first aspect of the invention may comprise (a) processing means arranged to create at the terminal a section of a representation of the signals from the transmitters received by the receiver;

(b) processing means arranged to create a first section of a representation of the signal transmitted by a first of said transmitters, and to create a second section of a representation of the signal transmitted by a second of said transmitters, each of which sections overlaps in time with the section created at the terminal;

(c) processing means arranged to create a first function dependent on the first section and the section created at the terminal in step (a), and convolve the first section with the first function to form a blurred estimate of the signal received at the terminal from the first transmitter;

(d) processing means arranged to create a second function dependent on the first section and the section created at the terminal in step (a), and convolve the terminal section with the second function to form a blurred terminal section;

(e) processing means arranged to subtract the blurred estimate from the blurred terminal section to produce a blurred residual representation; and (f) processing means arranged to estimate the time offset between the blurred residual representation and the second section.

The apparatus for carrying out the second aspect of the invention, for finding the time offset relative to a reference within the terminal of a component of a signal transmitted by one of a plurality of transmitters of a communications network and received by a receiver attached to a terminal, may comprise (a) processing means arranged to create at the terminal a section of a representation of the signals from the transmitters received by the receiver (a "terminal section");

(b) processing means arranged to create a section of a representation of the signal transmitted by an other transmitter (a "transmitter section");

(c) processing means arranged to create a first function dependent on the terminal section and the transmitter section created in steps (a) and (b), and convolve the terminal section with the first function to form a blurred estimate of the signal received at the terminal from the other transmitter;

(d) processing means arranged to create a second function dependent on the terminal section and the transmitter section created in steps (a) and (b), and convolve the terminal section with the second function to form a blurred terminal section;

(e) processing means arranged to subtract the blurred estimate from the blurred terminal section to produce a blurred residual representation; and (f) processing means arranged to estimate the time offset between the blurred residual representation and the signal component.

The apparatus may be disposed in a handset or other terminal of a telecommunications network.

The invention also includes a communications network for carrying out the first aspect of the invention, the network comprising
- (a) a computing device or devices;
- (b) a terminal having a radio receiver attached to the terminal, means for creating a section of a representation of the signals, received by the radio receiver, from the transmitters of the communications network, and means for sending the section to the computing device or devices;
- (c) sampling devices associated with respective first and second of said transmitters for creating respective first and second sections of representations of the signal transmitted by the respective transmitter which overlap in time with the section created at the terminal, and for sending the sections of the representations created at said transmitters to said computing device or devices;

the computing device or devices being adapted to perform
1 creation of a first function dependent on the first section and the section created at the terminal, and a convolution of the first section with the first function to provide a blurred estimate of the signal received at the terminal from the first transmitter;
2 creation of a second function dependent on the first section and the section created at the terminal, and a convolution of the section created at the terminal with the second function to provide a blurred terminal section;
3 a subtraction of said blurred estimate from the blurred terminal section to produce a blurred residual representation;
4 a calculation of the time offset between the blurred residual representation and said second section.

A calculation of the position of the terminal may be made using said time offset.

The invention also includes a communications network for carrying out the second aspect of the invention, for finding the time offset relative to a reference within the terminal of a component of a signal transmitted by one of a plurality of transmitters of a communications network and received by a receiver attached to a terminal, the network comprising
- (a) a computing device or devices;
- (b) a terminal having a radio receiver attached to the terminal, means for creating a section of a representation of the signals, received by the radio receiver, from the transmitters of the communications network (a "terminal section"), and means for sending the section to the computing device or devices;
- (c) a sampling device associated with an other transmitter for creating a section of a representation of the signal transmitted by the other transmitter (a "transmitter section") which overlaps in time with the section created at the terminal, and for sending the section of the representations created at the other transmitter to said computing device or devices;

the computing device or devices being adapted to perform
1 creation of a first function dependent on the transmitter section and the terminal section, and a convolution of the transmitter section with the first function to provide a blurred estimate of the signal received at the terminal from the other transmitter;
2 creation of a second function dependent on the transmitter section and the terminal section, and a convolution of the terminal section with the second function to provide a blurred terminal section;
3 a subtraction of said blurred estimate from the blurred terminal section to produce a blurred residual representation;
4 a calculation of the time offset between the blurred residual representation and the signal component.

A calculation of the position of the terminal may be made using said time offset.

The E-OTD positioning systems described generally above work with unsynchronised networks, i.e. any common component of the signals transmitted by any one transmitter is not synchronised in time with the transmission of that component by any other of the transmitters, but instead is transmitted after an unknown time delay, sometimes called the Relative Transmission Delay (RTD). The position calculation requires that this delay is known, and so the positioning systems employ fixed receivers at known locations throughout the network which are set up to measure the transmitted signals and compute the RTDs. It has been described above how the hearability problem hinders the straightforward application of the E-OTD techniques to direct-sequence CDMA systems. However, the second aspect of the present invention overcomes the hearability problem by allowing the very strong signals from a local transmitter to be subtracted from the signals received by the fixed receiver, thus allowing the much weaker signals from the distant transmitters to be measured. The method of application of E-OTD to CDMA systems then follows that described, for example, in our EP-A-1025453.

The invention also includes one or more computing devices in which the calculations described herein above are made.

The means for carrying out the calculations in the computing device or devices may be components of hardware and/or software.

Therefore, the invention includes a computer program or programs having computer program code means for carrying out the steps performed in the computing device or devices as described above.

Figure 2:
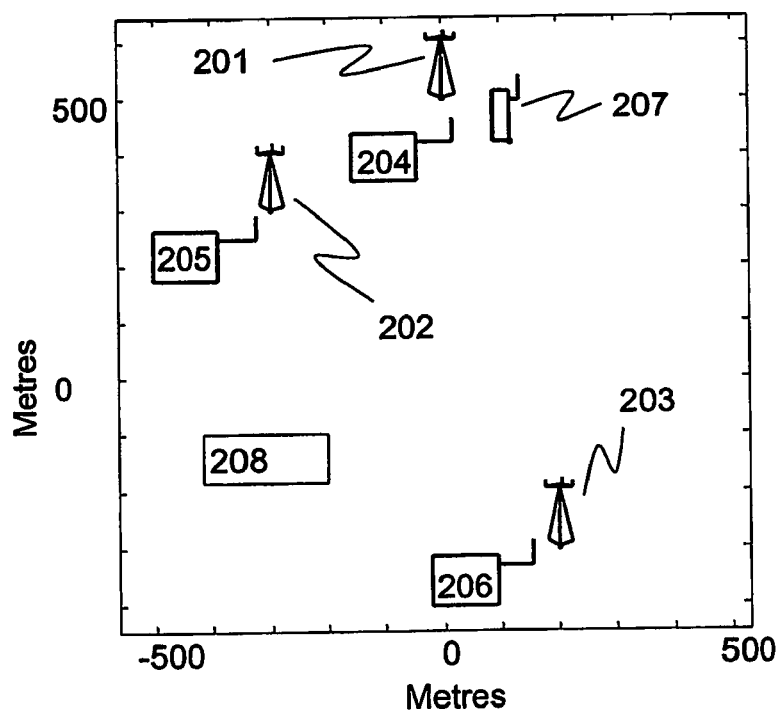
FIG. 2 shows a simplified UMTS communications network.
Figure 3:
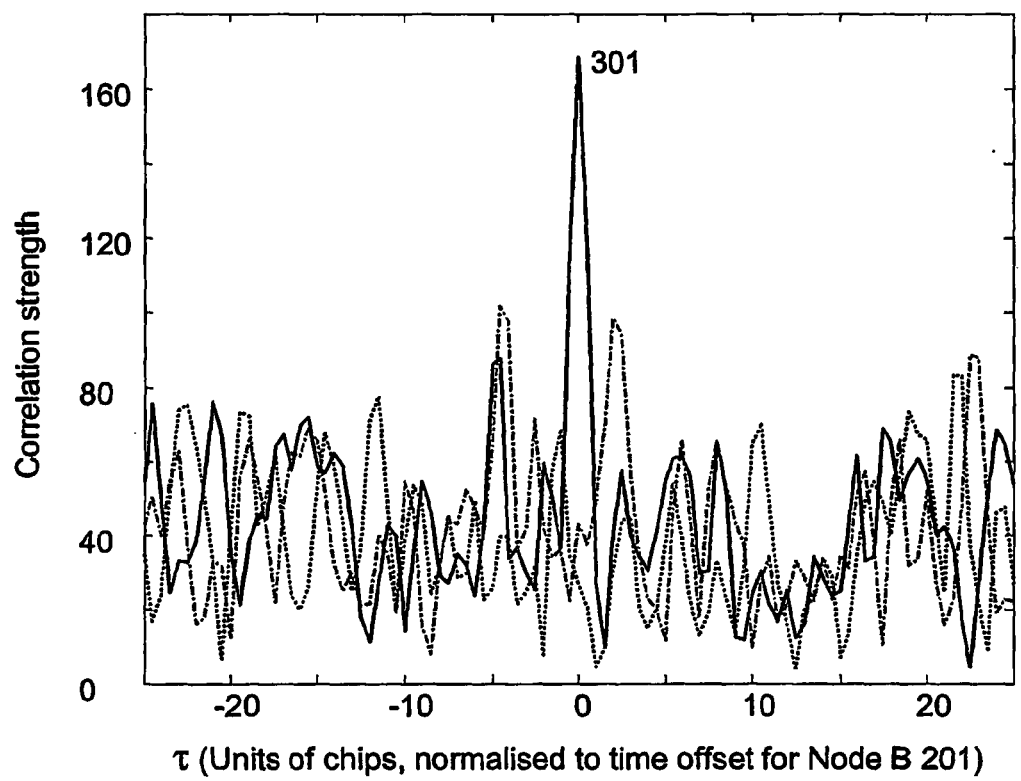
FIG. 3 illustrates the correlation of a reference copy of the primary scrambling code used on the pilot code channel (CPICH) by each Node B of the UMTS network with a recording of the received signal.
Figure 4:
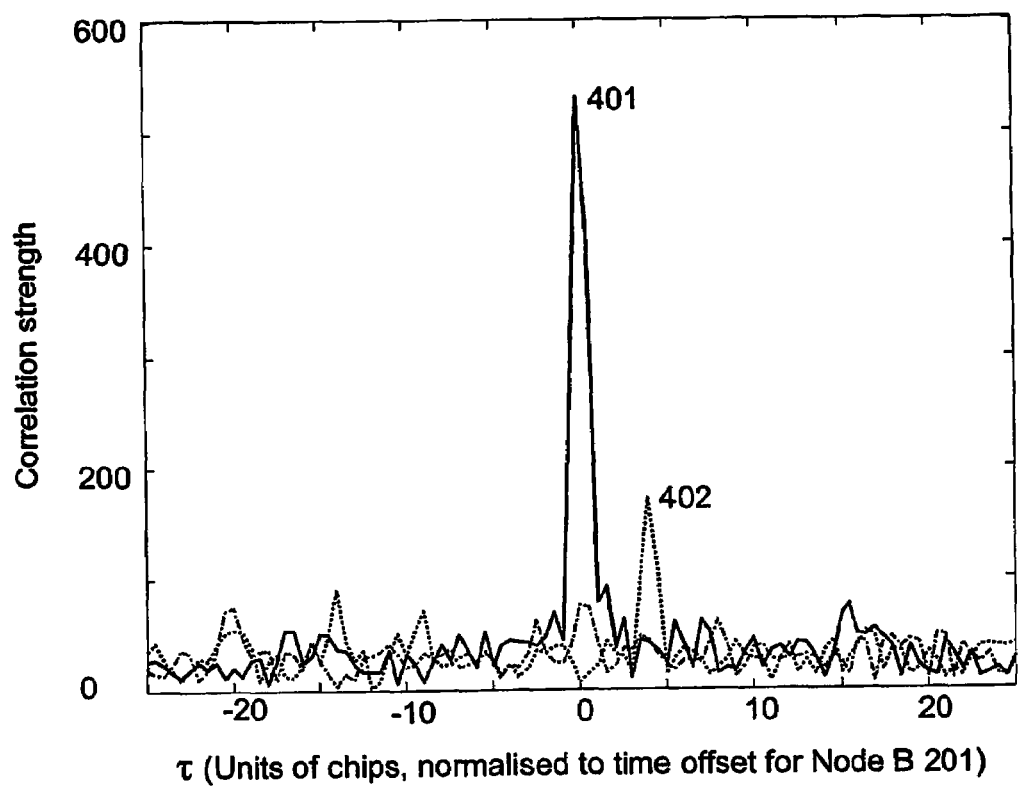
FIG. 4 shows the result of cross-correlating the recording received by a terminal with recordings of the transmitted signals.
Figure 5:
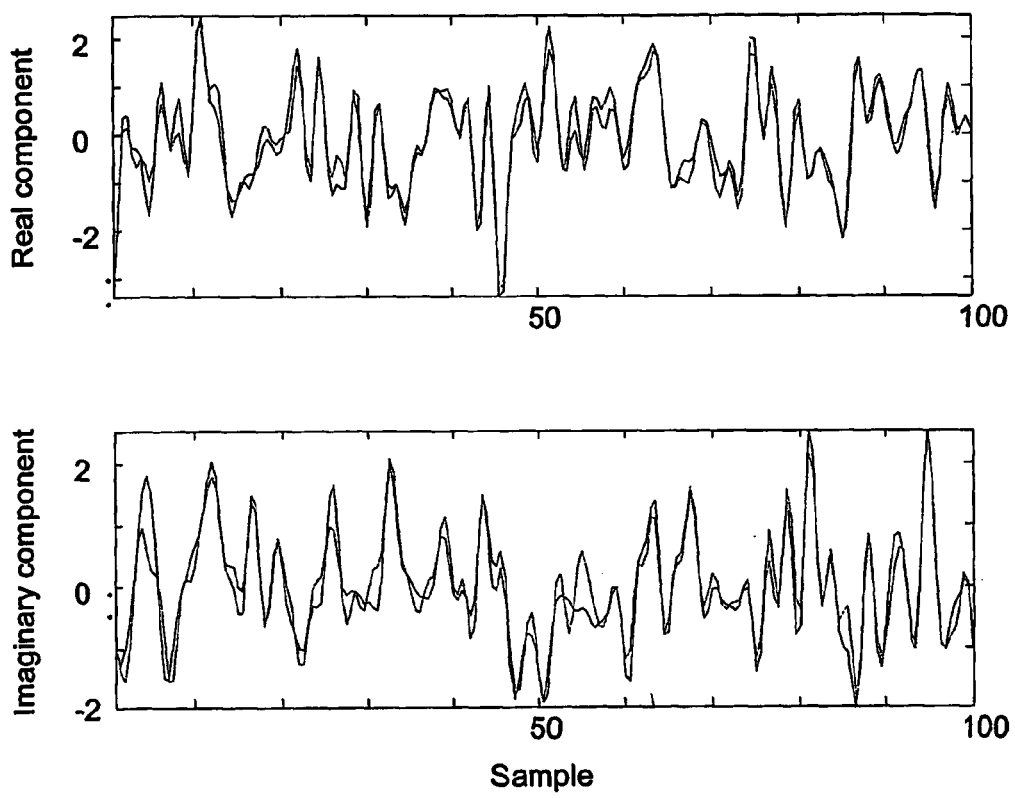
FIG. 5 illustrates measured and estimated recordings.
Figure 6:
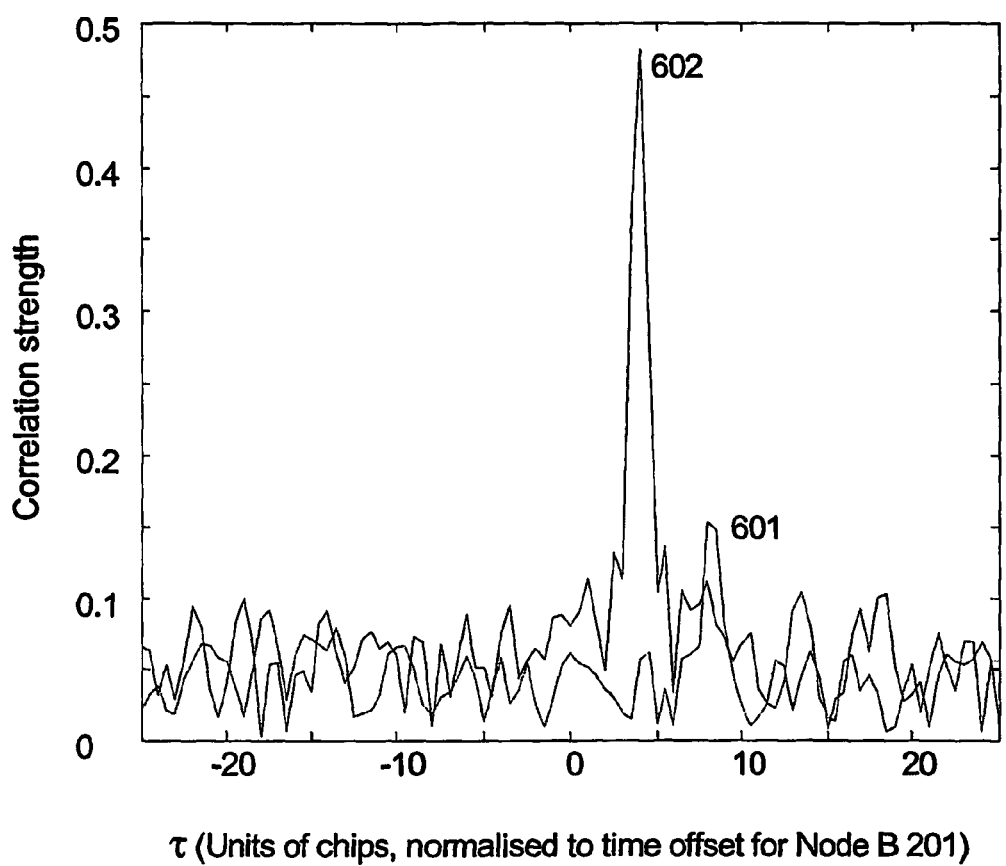
FIG. 6 shows the cross-correlation of a residual recording with recordings of transmitted signals.
Figure 7:
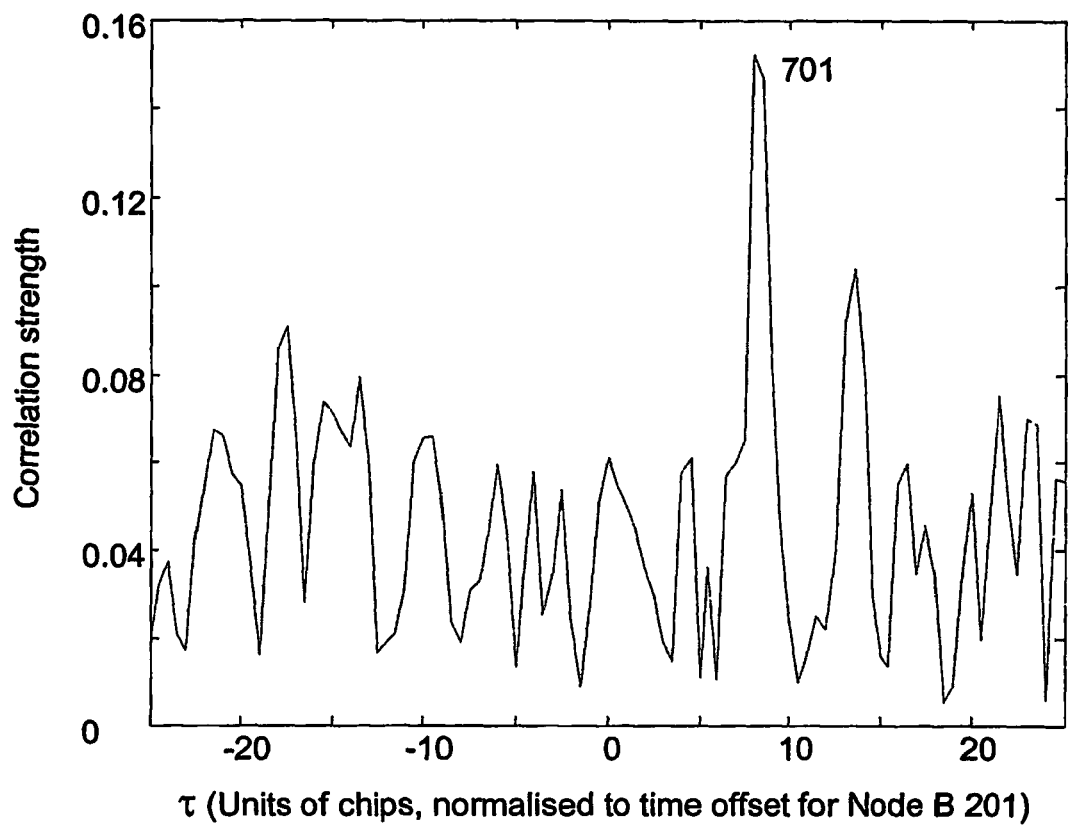
FIG. 7 shows the cross-correlation of a further residual recording with a recording of a transmitted signal.
Figure 8:
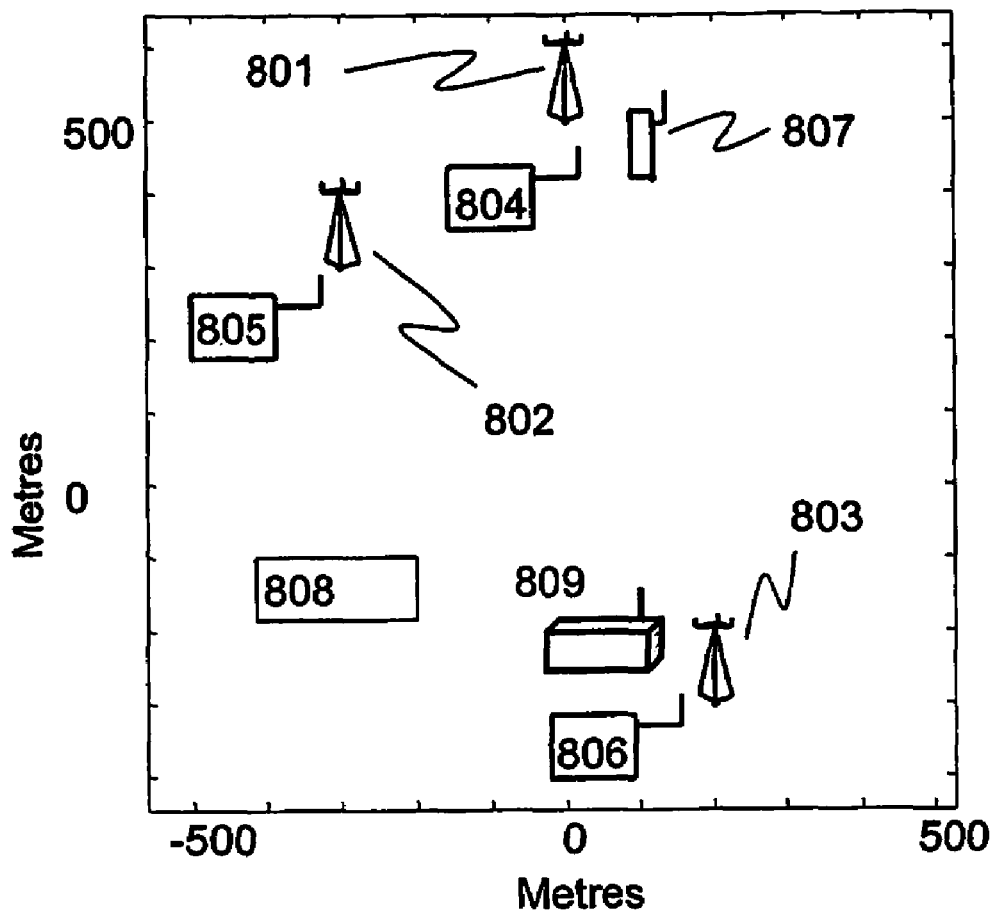
FIG. 8 shows another simplified communications network.

The invention may be further understood by reference to the accompanying drawings, in which:

FIG. 1 shows the geometry of a two-dimensional communications system in which all the transmitters and the mobile terminal lie in one plane;

FIG. 2 shows a simplified UMTS communications network;

FIG. 3 illustrates the correlation of a reference copy of the primary scrambling code used on the pilot code channel (CPICH) by each Node B of the UMTS network with a recording of the received signal;

FIG. 4 shows the result of cross-correlating the recording received by a terminal with recordings of the transmitted signals;

FIG. 5 illustrates measured and estimated recordings;

FIG. 6 shows the cross-correlation of a residual recording with recordings of transmitted signals;

FIG. 7 shows the cross-correlation of a further residual recording with a recording of a transmitted signal; and FIG. 8 shows another simplified communications network.

The same apparatus as described above in relation to EP01306115.5, when suitably programmed, can be used for the purposes of the present invention and the following description assumes that it is so used.

The following mathematical analysis provides an understanding of the concepts involved in the present application.

It is unlikely that the signal received at the terminal 207 will be a simple sum of the transmitted signals attenuated and delayed by the individual path lengths between a transmitter 201, 202, 203 and the receiver in the terminal 207, as described above in relation to the example of the prior art method of EP 01306115.5. In practice, it has been appreciated that the component of the signal received at the terminal 207 from, say the transmitter 201 annotated as "A" can be represented by a convolution of the transmitted signal $S^A(t)$ and the 'channel profile' $h_A(t)$ which models the multi-path effects. This constitutes a 'blurring' of the actual received signal. [Mathematically, a convolution is defined as the integral of one function of x multiplied by another function of u−x, typically from minus infinity to infinity over x. So the convolution is a function of a new variable u. Convolution is also commutative in nature.] Following this understanding of the way in which the received signal r(t) can be represented, it is then possible to represent r(t) by the equation:

$$r(t) = \sum_{i=1}^{N} S_i(t) * h_i(t),$$

where the sum is taken over all the signals from the N transmitters (numbered 1 to N where transmitter A is one of the set), t is the time, and the * symbol represents convolution. The estimate of the signal received from each transmitter to be subtracted from r(t) must therefore take account of this convolution of the transmitted signal with the 'channel profile'.

However, as has been widely described in the literature, the general problem of de-convolution (the reverse process from convolution) and which is necessary in this case to estimate the form of the channel profile h from the known transmitted signal S and the representation r is far from straightforward, and there are many methods of doing so (see for example Anibal et. al. 1990, *IEEE trans. acoustic speech and signal processing*, 38, 1462-1466).

One method of overcoming the de-convolution issue is of particular interest here, and this involves subtraction of a 'blurred' estimate of the brightest signal received at the terminal from a 'blurred' version of r(t), the blurring here again referring to the process of convolution. This may be carried out in the terminal 207 or (in the case that recordings of the signals are passed back to the SLMC from the terminal 207) in the SLMC 208 or elsewhere if desired. In this case, and referring once again to the conditions of FIG. 2/FIG. 1 and assuming that the signal from transmitter 201/A is the brightest of the signals received at the terminal 207/R, an estimate of a convolved version of the signal received at the terminal from transmitter 201/A is made, the convolution being with a signal derived from r(t) and $S_A(t)$ (see below). This convolution involves loss of some information, and hence is a smearing or blurring of the signal. The section of the representation of the signal received at the terminal is also first convolved with a signal derived from $S_A(t)$ before the subtraction step described above. These extra steps of convolution are useful in that it is often the case in practice that convolved estimates may be made more accurately than unconvolved estimates. The inaccuracies of the unconvolved estimate may be seen in FIG. 5, which lead to substantial errors introduced into the residual recordings of the weaker signals.

This particular blurring method may be explained more clearly as follows, referring to FIG. 1. As mentioned above, it is assumed that the signal from transmitter A is the brightest of the signals received at the terminal R, and that it dominates the total received signal. A cross-correlation between r(t) and $S_A(t)$ then yields a cross-correlation profile in which the contribution from A can be clearly seen, and the time offset of the signals can be deduced (for example from the position of the peak).

If the cross-correlation profile is described by a(τ), which exemplifies a first function, then $$a(\tau) = r(t) \otimes S_A(t)$$
$$= [S_A(t) * h_A(t) + S_B(t) * h_B(t) + \ldots] \otimes S_A(t)$$
$$\approx S_A(t) * h_A(t) \otimes S_A(t)$$
$$= p_A(\tau) * h_A(t),$$

where the $\hat{x}$ symbol represents cross-correlation, τ is the delay, and $p_A(\tau)$, which exemplifies a second function, is the auto-correlation profile of $S_A(t)$. Note that the terms of r(t) including $S_B(t)$ etc. become negligible upon cross correlating with $S_A(t)$ as the signals from transmitters A, B etc have orthogonal spreading codes and the signal from A is much brighter than any other.

The cross-correlation profile a(τ) is now analysed for 'channel support', i.e. the region of delays over which the signal from $S_A(t)$ produces significant values (the rest being noise), and this region is enhanced with respect to the rest by multiplying the cross-correlation profile by a window function. The simplest window function is a 'top-hat' function which multiplies the wanted region by unity and the rest by zero. A more graduated window might be used in some applications.

The windowed cross-correlation profile â(τ) is now convolved with $S_A(t)$ and, since the signal from A dominates, the result represents a good estimate b(t) of the quantity to be subtracted from a version of r(t) which has been convolved with the autocorrelation profile of $S_A(t)$. Thus $$b(t) = S_A(t) * \hat{a}(\tau)$$
$$\approx S_A(t) * p_A(\tau) * h_A(t).$$

The result of the subtraction process is now a blurred version r'(t) of the residual where $$r'(t) = r(t) * p_A(\tau) - b(t)$$
$$= [S_A(t) * h_A(t) * p_A(\tau) + S_B(t) * h_B(t) * p_A(\tau) + \ldots] - b(t)$$
$$\approx S_B(t) * h_B(t) * p_A(\tau) + \ldots ,$$

but the blurring has only a slight effect on the precision with which the subtraction of the next-brightest signal, from a transmitter B (say 202 in FIG. 2), can be made and on the precision with which the time delay can be estimated. The blurred residual r'(t) can therefore be cross-correlated with $S_B(t)$ in order to estimate the time offset of the signal from transmitter 202/B. The procedure is then repeated until there are no signals of interest left to be measured.

One of the requirements of the invention is that the recordings of the signals made at A, B, C, (say 201, 202 203) and R (say 207) overlap in time with each other. The recording process in the mobile terminal 207/R can be initiated, for example, by the receipt of a particular aspect of the signal transmitted by the serving transmitter (201/A in the above analysis). The recordings made in the transmitters must all be loosely synchronised with this aspect. Where the transmitters are synchronised with each other, as in the IS 95 standard, the aspect will be transmitted at approximately the same time by all transmitters in the network. In unsynchronised systems, however, other means such as GPS clocks or the concepts described in our WO-A-00/73814, EP application no. 01301679.5 and EP application no. 01308508.9 may be used.

As explained earlier, the present invention can also be applied to the fixed terminals (LMUs) of a positioning system using conventional E-OTD techniques, for example as shown in FIG. 8, in which transmitters 801 to 803 have associated sampling devices 804 to 806 respectively. In this case, a fixed terminal (LMU 809) is co-sited with the transmitter 803, but is connected to a separate receiving antenna. The LMU 809, which needs to support a large dynamic range and display exceptionally good linear characteristics, receives the signals picked up by its antenna, creates a section of a representation of the signals as described above, and sends the section to a computing device 808. The method described herein above in the second aspect is used to reduce the effect of the brightest signal (usually from the co-sited transmitter) so that the signals received from the other, more distant, transmitters of the network may be measured. Thus far, the process is exactly as described for the mobile terminal discussed above in connection with a CDMA communications network. The purpose of the LMU, 809 however, is to furnish as many timing offsets between the signals received from all the transmitters as it can. The very bright signal received from the local, usually co-sited, transmitter 803 furnishes an accurate timing for that transmitter through analysis of the section of the representation sent by the LMU 809 to the computing device 808 and, subsequently, the blurred residual representation may be analysed for the remaining signals from other transmitters.

The analysis of both the representation and the blurred residual representation to find the time offset of a particular component may be carried out, in accordance with the second aspect of the invention, as follows. The pilot code, transmitted on CPICH by a given transmitter 801,802,803, is a binary sequence which is known in advance. This is modulated by passing it through, for example, a raised-cosine filter so that it matches as closely as possible the signal received from the transmitter on CPICH. This reference sequence is then cross-correlated with the section of the representation of the received signals, or the blurred residual representation, in order to identify a peak corresponding to the time offset of the signal received from the corresponding transmitter with respect to the reference, as illustrated above in FIG. 3. The position of the peak is an estimate of the time offset.

The second aspect of the invention can also be applied in a portable terminal 807. In this case, the subtraction of the brightest signal from, say, transmitter 801 allows the time offsets of the weaker pilot codes radiated by transmitters 802, 803 to be measured. In this way, the time offsets off the signals from the two more-distant transmitters 802, 803 may be determined within the terminal in addition to the time offset from the nearby transmitter 801 to be used in a conventional trilateration calculation of the terminal's position, as described in, for example, U.S. Pat. No. 6,094,168.

Any of the methods of the invention may be used in the process of tracking a moving handset. Periodic sets of timing measurements may be used to locate a moving terminal and, depending on the apparatus used, quasi-continuous tracking can thereafter be achieved. For example, a set of time offset estimates of at least three geographically-distinct transmitters can be made, using one of the methods of the invention, from which the current location of the terminal can be estimated. The moving handset can then be tracked for a short while using timing measurements derived from the signals from the brightest one or two local transmitters only i.e. without the need to counter the hearability problem for the weaker signals by applying a method of the invention. The handset may therefore be tracked continuously with occasional application of a method of the invention, supplemented by more frequent measurements upon the local transmitters only.

The invention claimed is:

1. A method of finding the time offset between signals transmitted by at least one of a plurality of transmitters (A, B, C) of a communications network and received by a receiver attached to a terminal, the method comprising the steps of
    (a) creating at the terminal a terminal section (r(t)) of a representation of the signals from the transmitters received by the receiver;
    (b) creating a first section ($S_A(t)$) of a representation of the signal transmitted by a first (A) of said transmitters, and creating a second section ($S_B(t)$) of a representation of the signal transmitted by a second (B) of said transmitters, each of which sections overlaps in time with the terminal section (r(t));
    (c) creating a first function ($\hat{a}(\tau)$) dependent on the first section ($S_A(t)$) and the terminal section (r(t)), and convolving the first section with the first function to form a blurred estimate (b(t)) of the signal received at the terminal from the first transmitter (A);
    (d) creating a second function ($p_A(\tau)$) dependent on the first section ($S_A(t)$), and convolving the terminal section with the second function to form a blurred terminal section ($r(t)*p_A(\tau)$);
    (e) subtracting the blurred estimate (b(t)) from the blurred terminal section ($r(t)*p_A(\tau)$) to produce a blurred residual representation ($r'(t)=r(t)*p_A(\tau)-b(t)$); and
    (f) estimating the time offset between the blurred residual representation (r'(t)) and the second section ($S_B(t)$).

2. A method according to claim 1, wherein the first function ($\hat{a}(\tau)$), which is used to create the blurred estimate, is a windowed cross-correlation of the first section ($S_A(t)$) with the terminal section (r(t)), created by enhancing the significant components of the cross-correlation function.

3. A method according to claim 1, wherein the second function ($p_A(\tau)$), which is used to create the blurred terminal section, is the auto-correlation profile ($p_A(\tau)$) of the first section ($S_A(t)$).

4. A method according to claim 1, wherein the blurred residual representation ($r'(t)=r(t)*p_A(\tau)-b(t)$) is cross-correlated with the second section ($S_B(t)$) of a representation of the signal transmitted by a second (B) of said transmitters to estimate the time offset.

5. A method according to claim 1, wherein the first ($S_A(t)$) and second ($S_B(t)$) sections are created at the respective first (A) and second (B) transmitters.

6. A method according to claim 1, wherein the first ($S_A(t)$) and second ($S_B(t)$) sections are created in one or more sampling devices attached to the respective transmitters or located elsewhere.

7. A method according to claim 1, wherein the first ($S_A(t)$) and second ($S_B(t)$) sections are created by computer programs running anywhere in the communications network, or elsewhere, using information supplied from the network about the transmitted signals.

8. A method of finding the time offset relative to a reference within the terminal of a component of a signal transmitted by one of a plurality of transmitters of a communications network and received by a receiver attached to a terminal, the method comprising the steps of
- (a) creating a terminal section (r(t)) of a representation of the signals from the transmitters received by the receiver;
- (b) creating as a transmitter section a section of a representation of the signal transmitted by an other transmitter, which transmitter section overlaps in time with the terminal section created;
- (c) creating a first function ($\hat{a}(\tau)$) dependent on the terminal section (r(t)) and the transmitter section created in steps (a) and (b), and convolving the terminal section with the first function to form a blurred estimate (b(t)) of the signal received at the terminal from the other transmitter;
- (d) creating a second function ($p_A(\tau)$) dependent on the terminal section (r(t)), and convolving the terminal section with the second function to form a blurred terminal section r(t)*$p_A(\tau)$);
- (e) subtracting the blurred estimate (b(t)) from the blurred terminal section (r(t)*$p_A(\tau)$) to produce a blurred residual representation (r'(t)=r(t)*$p_A(\tau)$−b(t)); and
- (f) estimating the time offset between the blurred residual representation (r'(t)) and the signal component.

9. A method according to claim 8, wherein the first function, which is used to create the blurred estimate, is a windowed cross-correlation of the transmitter section with the terminal section created by enhancing the significant components of the cross-correlation function.

10. A method according to claim 8, wherein the second function, which is used to create the blurred terminal section, is the auto-correlation profile of the transmitter section.

11. A method according to claim 8, wherein the known components of the transmitted signals are pilot codes.

12. A method according to claim 8, wherein, before the time offset is estimated, the known signal components of the transmitted signals are blurred by convolution with another function.

13. A method according to claim 8, wherein the section of the representation of the signals transmitted by a transmitter is created at that transmitter.

14. A method according to claim 8, wherein the section of the representation of the signals transmitted by a transmitter is created in one or more sampling devices attached to the respective transmitters or located elsewhere.

15. A method according to claim 8, wherein the section of the representation of the signals transmitted by a transmitter is created by a computer program running anywhere in the communications network, or elsewhere, using information supplied from the network about the transmitted signals.

16. A method according to claim 8, wherein the section of the representation of the signals received by the receiver at the terminal is recorded in the terminal before being sent to a computing device.

17. A method according to claim 8, wherein the section of the representation of the signals received by the receiver at the terminal is transferred in real time to the computing device and a recording made there.

18. A method according to claim 8, wherein the representation of the signals received by the receiver attached to the terminal is a digitised version of the received signals converted first to baseband in the receiver.

19. A method according to claim 8, wherein the representation of the signals transmitted by a transmitter (A, B) is a digitised version of the transmitted signals converted first to baseband.

20. Apparatus for finding the time offset between signals transmitted by at least one of a plurality of transmitters (A, B, C) of a communications network and received by a receiver attached to a terminal, the apparatus comprising
- (a) processing means arranged to create at the terminal a terminal section (r(t)) of a representation of the signals from the transmitters received by the receiver;
- (b) processing means arranged to create a first section ($S_A(t)$) of a representation of the signal transmitted by a first (A) of said transmitters, and to create a second section ($S_B(t)$) of a representation of the signal transmitted by a second (B) of said transmitters, each of which sections overlaps in time with the terminal section (r(t));
- (c) processing means arranged to create a first function ($\hat{a}(\tau)$) dependent on the first section ($S_A(t)$) and the terminal section (r(t)), and to convolve the first section with the first function to form a blurred estimate (b(t)) of the signal received at the terminal from the first transmitter (A);
- (d) processing means arranged to create a second function ($p_A(\tau)$) dependent on the first section ($S_A(t)$), and to convolve the terminal section (r(t)) with the second function ($p_A(\tau)$) to form a blurred terminal section (r(t)*$p_A(\tau)$);
- e) processing means arranged to subtract the blurred estimate (b(t)) from the blurred terminal section (r(t)*$p_A(\tau)$) to produce a blurred residual representation (r(t)*$p_A(\tau)$−b(t)); and
- (f) processing means arranged to estimate the time offset between the blurred residual representation (r(t)*$p_A(\tau)$−b(t)) and the second section ($S_B(t)$).

21. Apparatus for finding the time offset relative to a reference within the terminal of a component of a signal transmitted by one of a plurality of transmitters of a communications network and received by a receiver attached to a terminal, the apparatus comprising
- (a) processing means arranged to create at the terminal a terminal section (r(t)) of a representation of the signals from the transmitters received by the receiver;
- (b) processing means arranged to create, as a transmitter section, a section of a representation of the signal transmitted by an other transmitter;
- (c) processing means arranged to create a first function ($\hat{a}(\tau)$) dependent on the terminal section (r(t)), and convolve the terminal section with the first function to form a blurred estimate (b(t)) of the signal received at the terminal from the other transmitter;
- (d) processing means arranged to create a second function ($p_A(\tau)$) dependent on the terminal section and the transmitter section created in steps (a) and (b), and convolve the terminal section with the second function to form a blurred terminal section (r(t)*$p_A(\tau)$);
- (e) processing means arranged to subtract the blurred estimate (b(t)) from the blurred terminal section (r(t)*$p_A(\tau)$) to produce a blurred residual representation (r'(t)=r(t)*$p_A(\tau)$−b(t)); and
- (f) processing means arranged to estimate the time offset between the blurred residual representation (r'(t)) and the signal component.

22. A telecommunications terminal having an apparatus for finding the time offset between signals transmitted by at least one of a plurality of transmitters of a communications network and received by a receiver attached to a terminal, the apparatus comprising
- (a) processing means arranged to create at the terminal a terminal section (r(t)) of a representation of the signals from the transmitters received by the receiver;

(b) processing means arranged to create a first function ($\hat{a}(\tau)$) dependent on a first section ($S_A(t)$) of a representation of the signal transmitted by a first of said transmitters which overlaps in time with the terminal section ($r(t)$) and which is sent to the terminal and on the terminal section ($r(t)$) created at the terminal in step (a), and convolve the first section with the first function to form a blurred estimate ($b(t)$) of the signal received at the terminal from the first transmitter;

(c) processing means arranged to create a second function ($p_A(\tau)$) dependent on the first section, and convolve the section created at the terminal with the second function to form a blurred terminal section ($r(t)*p_A(\tau)$);

(d) processing means arranged to subtract the blurred estimate ($b(t)$) from the blurred terminal section ($r(t)*p_A(\tau)$) to produce a blurred residual representation ($r'(t)=r(t)*p_A(\tau)-b(t)$); and (e) processing means arranged to estimate the time offset between the blurred residual representation ($r'(t)$) and a second section ($S_B(t)$) of a representation of the signal transmitted by a second of said transmitters which overlaps in time with the section created at the terminal and which is sent to the terminal.

23. A telecommunications terminal having an apparatus for finding the time offset relative to a reference within the terminal of a component of a signal transmitted by one of a plurality of transmitters of a communications network and received by a receiver attached to a terminal, the apparatus comprising (a) processing means arranged to create at the terminal a terminal section ($r(t)$ of a representation of the signals from the transmitters received by the receiver);

(b) processing means arranged to create a first function ($\hat{a}(\tau)$ dependent on the terminal section ($r(t)$) and a transmitter section being a section of a representation of the signal transmitted by another transmitter which is sent to the terminal, and convolve the terminal section with the first function to form a blurred estimate ($b(t)$) of the signal received at the terminal from the other transmitter;

(c) processing means arranged to create a second function ($p_A(\tau)$) dependent on the transmitter section, and convolve the terminal section with the second function to form a blurred terminal section ($r(t)*p_A(\tau)$);

(d) processing means arranged to subtract the blurred estimate ($b(t)$) from the blurred terminal section ($r(t)*p_A(\tau)$) to produce a blurred residual representation ($r'(t)=r(t)*p_A(\tau)-b(t)$); and (e) processing means arranged to estimate the time offset between the blurred residual representation ($r'(t)$) and the signal component.

24. A communications network for finding the time offset between signals transmitted by at least one of a plurality of transmitters of a communications network and received by a receiver attached to a terminal, the network comprising (a) a computing device or devices;

(b) a terminal having a radio receiver attached to the terminal, means for creating a terminal section ($r(t)$) of a representation of the signals, received by the radio receiver, from the transmitters of the communications network, and means for sending the terminal section to the computing device or devices;

(c) sampling devices associated with respective first and second of said transmitters for creating respective first and second sections ($S_A(t)$) and ($S_B(t)$) of representations of the signal transmitted by the respective transmitters which overlap in time with the terminal section, and for sending the sections of the representations created at said transmitters to said computing device or devices;

the computing device or devices being adapted to perform 1 creation of a first function ($\hat{a}(\tau)$) dependent on the first section and the terminal section ($r(t)$), and a convolution of the first section with the first function to provide a blurred estimated $b(t)$) of the signal received at the terminal from the first transmitter;

2 creation of a second function ($p_A(\tau)$) dependent on the first section, and a convolution of the terminal section with the second function to provide a blurred terminal section ($r(t)*p_A(\tau)$);

3 a subtraction of said blurred estimate ($b(t)$) from the blurred terminal section ($r(t)*p_A(\tau)$) to produce a blurred residual representation ($r'(t)=r(t)*p_A(\tau)-b(t)$;

4 a calculation of the time offset between the blurred residual representation ($r'(t)$) and said second section ($S_B(t)$).

25. A communications network for finding the time offset relative to a reference within the terminal of a component of a signal transmitted by one of a plurality of transmitters of a communications network and received by a receiver attached to a terminal, the network comprising (a) a computing device or devices;

(b) a terminal having a radio receiver attached to the terminal, means for creating a terminal section ($r(t)$) of a representation of the signals received by the radio receiver from the transmitters of the communications network, and means for sending the section to the computing device or devices;

(c) a sampling device associated with an other transmitter for creating, as a transmitter section, a section of a representation of the signal transmitted by the other transmitter which overlaps in time with the terminal section, and for sending the section of the representations created at the other transmitter to said computing device or devices;

the computing device or devices being adapted to perform 1 creation of a first function ($\hat{a}(\tau)$) dependent on the transmitter section and the terminal section ($r(t)$), and a convolution of the transmitter section with the first function to provide a blurred estimate ($b(t)$) of the signal received at the terminal from the other transmitter;

2 creation of a second function ($p_A(\tau)$) dependent on the transmitter section, and a convolution of the terminal section with the second function to provide a blurred terminal section $r(t)*p_A(\tau)$);

3 a subtraction of said blurred estimate ($b(t)$) from the blurred terminal section $r(t)*p_A(\tau)$) to produce a blurred residual representation $r'(t)=r(t)*p_A(\tau)-b(t)$);

4 a calculation of the time offset between the blurred residual representation ($r'(t)$) and the signal component.

26. A computing device or devices for use in a communications network comprising a terminal having a radio receiver attached to the terminal, means for creating a terminal section ($r(t)$) of a representation of the signals received by the radio receiver from the transmitters of the communications network, and means for sending the terminal section to the computing device or devices; and sampling devices associated with respective first and second of said transmitters for creating respective first and second sections ($S_A(t)$) and ($S_B(t)$) of representations of the signal transmitted by the respective transmitter which overlap in time with the section created at the terminal, and for sending the sections of the representations created at said transmitters to said computing device or devices, the computing device or devices being adapted to perform
1. creation of a first function ($\hat{a}(\tau)$) dependent on the first section and the terminal section ($r(t)$), and a convolution of the first section with the first function to provide a blurred estimate ($b(t)$) of the signal received at the terminal from the first transmitter;
2. creation of a second function ($p_A(\tau)$) dependent on the first section, and a convolution of the terminal section with the second function to provide a blurred terminal section ($r(t)*p_A(\tau)$);
3. a subtraction of said blurred estimate ($b(t)$) from the blurred terminal section ($r(t)*p_A(\tau)$) to produce a blurred residual representation $r'(t)=r(t)*p_A(\tau)-b(t)$;
4. a calculation of the time offset between the blurred residual representation ($r'(t)$) and said second section ($S_B(t)$).

27. A computing device or devices for use in a communications network comprising a terminal having a radio receiver attached to the terminal, means for creating a terminal section ($r(t)$) of a representation of the signals, received by the radio receiver, from the transmitters of the communications network, and means for sending the terminal section to the computing device or devices; and a sampling device associated with an other transmitter for creating, as a transmitter section, a section of a representation of the signal transmitted by the other transmitter which overlaps in time with the section created at the terminal, and for sending the section of the representations created at the other transmitter to said computing device or devices, the computing device or devices being adapted to perform
1. creation of a first function ($\hat{a}(\tau)$) dependent on the transmitter section and the terminal section ($r(t)$), and a convolution of the transmitter section with the first function to provide a blurred estimate ($b(t)$) of the signal received at the terminal from the other transmitter;
2. creation of a second function ($p_A(\tau)$) dependent on the transmitter section, and a convolution of the terminal section with the second function to provide a blurred terminal section ($r(t)*p_A(\tau)$);
3. a subtraction of said blurred estimate ($b(t)$) from the blurred terminal section ($r(t)*p_A(\tau)$) to produce a blurred residual representation ($r'(t)=r(t)*p_A(\tau)-b(t)$);
4. a calculation of the time offset between the blurred residual representation ($r'(t)$) and the signal component.

28. A computer program or programs comprising computer program code means stored on a computer-readable medium and for use in a communications network comprising a terminal having a radio receiver attached to the terminal, means for creating a terminal section ($r(t)$) of a representation of the signals, received by the radio receiver, from the transmitters of the communications network, and means for sending the terminal section to the computing device or devices; and sampling devices associated with respective first and second of said transmitters for creating respective first and second sections ($S_A(t)$) and ($S_B(t)$) of representations of the signal transmitted by the respective transmitter which overlap in time with the section created at the terminal, and for sending the sections of the representations created at said transmitters to said computing device or devices, the computing device or devices being adapted to perform
1. creation of a first function ($\hat{a}(\tau)$) dependent on the first section and the terminal section ($r(t)$), and a convolution of the first section with the first function to provide a blurred estimate ($b(t)$) of the signal received at the terminal from the first transmitter;
2. creation of a second function ($p_A(\tau)$) dependent on the first section, and a convolution of the section created at the terminal with the second function to provide a blurred terminal section $r(t)*p_A(\tau)$);
3. a subtraction of said blurred estimate ($b(t)$) from the blurred terminal section ($r(t)*p_A(\tau)$) to produce a blurred residual representation ($r'(t)=r(t)*p_A(\tau)-b(t)$);
4. a calculation of the time offset between the blurred residual representation ($r'(t)$) and said second section ($S_B(t)$).

29. A computer program or programs comprising computer program code means stored on a computer-readable medium and for use in a communications network comprising a terminal having a radio receiver attached to the terminal, means for creating a terminal section ($r(t)$) of a representation of the signals, received by the radio receiver, from the transmitters of the communications network, and means for sending the terminal section to the computing device or devices; and a sampling device associated with another transmitter for creating, as a transmitter section, a section of a representation of the signal transmitted by the other transmitter which overlaps in time with the terminal section, and for sending the section of the representations created at the other transmitter to said computing device or devices, the computing device or devices being adapted to perform
1. creation of a first function ($\hat{a}(\tau)$) dependent on the transmitter section and the terminal section ($r(t)$), and a convolution of the transmitter section with the first function to provide a blurred estimate ($b(t)$) of the signal received at the terminal from the other transmitter;
2. creation of a second function ($p_A(\tau)$) dependent on the transmitter section, and a convolution of the terminal section with the second function to provide a blurred terminal section $r(t)*p_A(\tau)$);
3. a subtraction of said blurred estimate ($b(t)$) from the blurred terminal section ($r(t)*p_A(\tau)$) to produce a blurred residual representation ($r'(t)=r(t)*p_A(\tau)-b(t)$);
4. a calculation of the time offset between the blurred residual representation ($r'(t)$) and the signal component.

30. A method according to claim 1 further comprising the step of calculating the position of a mobile terminal in a communications network.

* * * * *